(12) United States Patent
Chen et al.

(10) Patent No.: US 7,418,063 B2
(45) Date of Patent: Aug. 26, 2008

(54) DTX DETECTION METHOD WITH HIGH SUCCESS PROBABILITY

(75) Inventors: Dayong Chen, Cary, NC (US); Leonard Lee, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 937 days.

(21) Appl. No.: 10/002,722

(22) Filed: Nov. 16, 2001

(65) Prior Publication Data

US 2003/0095507 A1 May 22, 2003

(51) Int. Cl.
*H03D 1/00* (2006.01)
*H04L 27/06* (2006.01)

(52) U.S. Cl. .................. 375/340; 375/324; 370/324; 370/503; 455/502; 455/437; 455/515

(58) Field of Classification Search .............. 375/340, 375/341, 346, 347, 324; 370/328, 458, 324, 370/503; 714/755, 781; 455/437, 502, 515
See application file for complete search history.

(56) References Cited

U.S. PATENT DOCUMENTS

| | | | | |
|---|---|---|---|---|
| 5,710,772 A * | 1/1998 | Sato | ............. | 370/458 |
| 6,092,230 A | 7/2000 | Wood et al. | ............. | 714/755 |
| 6,097,772 A | 8/2000 | Johnson et al. | ............. | 375/346 |
| 6,272,186 B1 * | 8/2001 | Bontu et al. | ............. | 375/340 |
| 6,286,122 B1 * | 9/2001 | Alanara | ............. | 714/781 |
| 6,842,438 B1 * | 1/2005 | Benedict et al. | ............. | 370/328 |
| 7,024,193 B2 * | 4/2006 | Tuutijarvi | ............. | 455/434 |

* cited by examiner

*Primary Examiner*—Ted Wang
(74) *Attorney, Agent, or Firm*—Coats & Bennett, P.L.L.C.

(57) ABSTRACT

A wireless communications system receiver classifies a received burst as a DTX-high state normal burst or a DTX-low state truncated burst with a high probability of success. D1, the Euclidean distance between the known CDVCC and the bit position of CDVCC in a normal burst, is determined by calculating a confidence-weighted correlation between the two bit patterns. In a high-noise environment, D2, the Euclidean distance between the known CDVCC and the bit position of CDVCC in a truncated burst, is calculated. The ratio D1/D2 is compared to a threshold to classify the DTX state of the received burst. D1 and D2 may be normalized by dividing by the maximum average RSSI over the received burst, plotted on a graph of normalized D1 vs. normalized D2, and compared to a predetermined thresholding function that minimizes the probability of false classification. The thresholding function may be a piece-wise linear curve.

21 Claims, 7 Drawing Sheets

DTX NORMAL BURST, 324 BITS

DTX TRUNCATED BURST, 68 BITS

RECEIVED BURST

DTX DETECTION METHOD WITH HIGH SUCCESS PROBABILITY

BACKGROUND OF THE INVENTION

The present invention relates generally to the field of wireless communications, and specifically to a method for discriminating between normal and truncated bursts in discontinuous transmission mode communications.

Discontinuous transmission (DTX) is a technique commonly used in wireless communications systems to reduce interference and conserve battery power. In conventional mobile communication networks, the mobile terminal transmits continuously on the uplink during a call. Normal conversation, however, contains a number of pauses between periods of speech, such as when a user listens to the other party. When a mobile terminal user is not speaking, transmission of the radio signal is not required from an information point of view. With discontinuous transmission, pauses in normal speech are detected in order to suspend radio transmission for the duration of the pause. Discontinuous transmission is typically an optional feature that can be enabled or disabled by the network as required. When used, discontinuous transmission can reduce air traffic, reduce interference between users, and extend battery life in mobile terminals.

During the periods during which no voice activity is detected, a transmitter may transmit nothing, or may transmit truncated bursts containing only radio control information. The transmission of at least some truncated bursts is desirable, to maintain a connection between the mobile terminal and the base station serving it, and to transmit control information. In either case, the state in which truncated bursts are transmitted is known as a DTX-low state; the state in which normal, full-length bursts are transmitted is known as a DTX-high state. The respective formats of a DTX-high, or normal, burst containing voice or data along with control information, and a DTX-low, or truncated, burst containing only control information, typically differ significantly. The wireless system receiver should be able to distinguish between the two, as the two types of burst transmissions are formatted differently, and the speech decoder will perform different operations based on whether the received data contains speech or random noise.

Several methods are known in the art for determining whether a received DTX burst is a normal burst or a truncated burst. Two examples of such methods are the use of Viterbi decoding metric and an estimated Bit Error Rate (BER) as the detection criteria. However, both methods suffer from poor DTX detection probability in high noise environments, i.e., when the Carrier-to-Interference Ratio (C/I) is low, or under high Rayleigh fading. At low C/I, both detection methods suffer from noise. For example, the Viterbi decoding metric can be an unreliable indicator if the correct path in the trellis corresponding to the correct code word is eliminated during channel decoding due to long bit error bursts in the received data. Similarly, the estimated BER is not necessarily the actual BER, as the receiver estimates the BER by re-encoding decoded data and then comparing the re-encoded data with the data originally received. Since the decoded data may have many residual bit errors after decoding, the re-encoded data may be similarly erroneous, and will result in incorrect BER estimates when compared with the received data. Statistically, the probability distributions of either detection method on normal and DTX truncated bursts overlap considerably, causing high detection error.

SUMMARY OF THE INVENTION

The present invention relates to a method of classifying a received data frame as belonging to one of a plurality of possible classes, each class having corresponding formats wherein a known bit pattern is located in different respective positions within the data frame. In one embodiment, the method comprises receiving the frame, computing a first value representing a confidence-weighted correlation between the known bit pattern and data from a first position of the frame, and classifying the frame as belonging to a first class or a second class based on the first value. The first value may be the Euclidean distance between a soft bit representation of a reference CDVCC and the received frame data bits corresponding to the position of the CDVCC in a normal burst. The classes may represent DTX normal and truncated bursts.

In another embodiment, the method further comprises computing a second value representing a confidence-weighted correlation between the known bit pattern and data from a second position of the frame different from the first position, and classifying the frame additionally based on the second value. The second value may be the Euclidean distance between a soft bit representation of the reference CDVCC and the received frame data bits corresponding to the position of the CDVCC in a truncated burst. A ratio of the first value to the second value may be calculated and compared to a predetermined threshold to classify the DTX state of the frame.

In another embodiment, the method further comprises calculating normalized first and second values by dividing the values by a measured parameter. The normalized values are compared to a predetermined thresholding function to classify the frame. One example of the measured parameter is the maximum of average RSSI over the received frame measured at each diversity receive antenna. The predetermined thresholding function is calculated to minimize the probability of false classification, and may comprise a piece-wise linear curve.

DETAILED DESCRIPTION OF THE INVENTION

The present invention is described herein with reference to the Telecommunications Industry Association (TIA)/Electronics Industry Alliance (EIA) standard TIA/EIA-136, which is incorporated herein by reference. The TIA/EIA-136 standard is a Time Division Multiple Access (TDMA) standard for cellular and personal communication services (PCS) networks. The present invention is not thus limited, however, and may also find utility in a cellular/PCS communication network based on Code Division Multiple Access (CDMA), such as IS-95, cdma2000, and Wideband CDMA (W-CDMA), or a broad variety of other wireless communications technologies and protocols.

Discontinuous transmission (DTX) is a technique used to reduce overall interference in the air interface. Particularly in CDMA technology wireless communications systems, a reduction in interference in the air interface can increase system capacity. DTX can also conserve power in mobile terminals. A conventional mobile terminal transmits continuously on the uplink whenever a call is in progress. Continuous transmission on the uplink, however, is inefficient since normal speech contains a number of pauses, for example, when the mobile terminal user is not speaking. Continuing transmission during such pauses conveys no useful information. The concept underlying DTX is to reduce interference and conserve power by switching off the transmitter during periods when speech is not present. When DTX is enabled, the mobile terminal switches between transmitting a normal burst (DTX High) during periods of user speech, and transmitting a truncated burst (DTX Low) during speech pauses.

Figure 1:
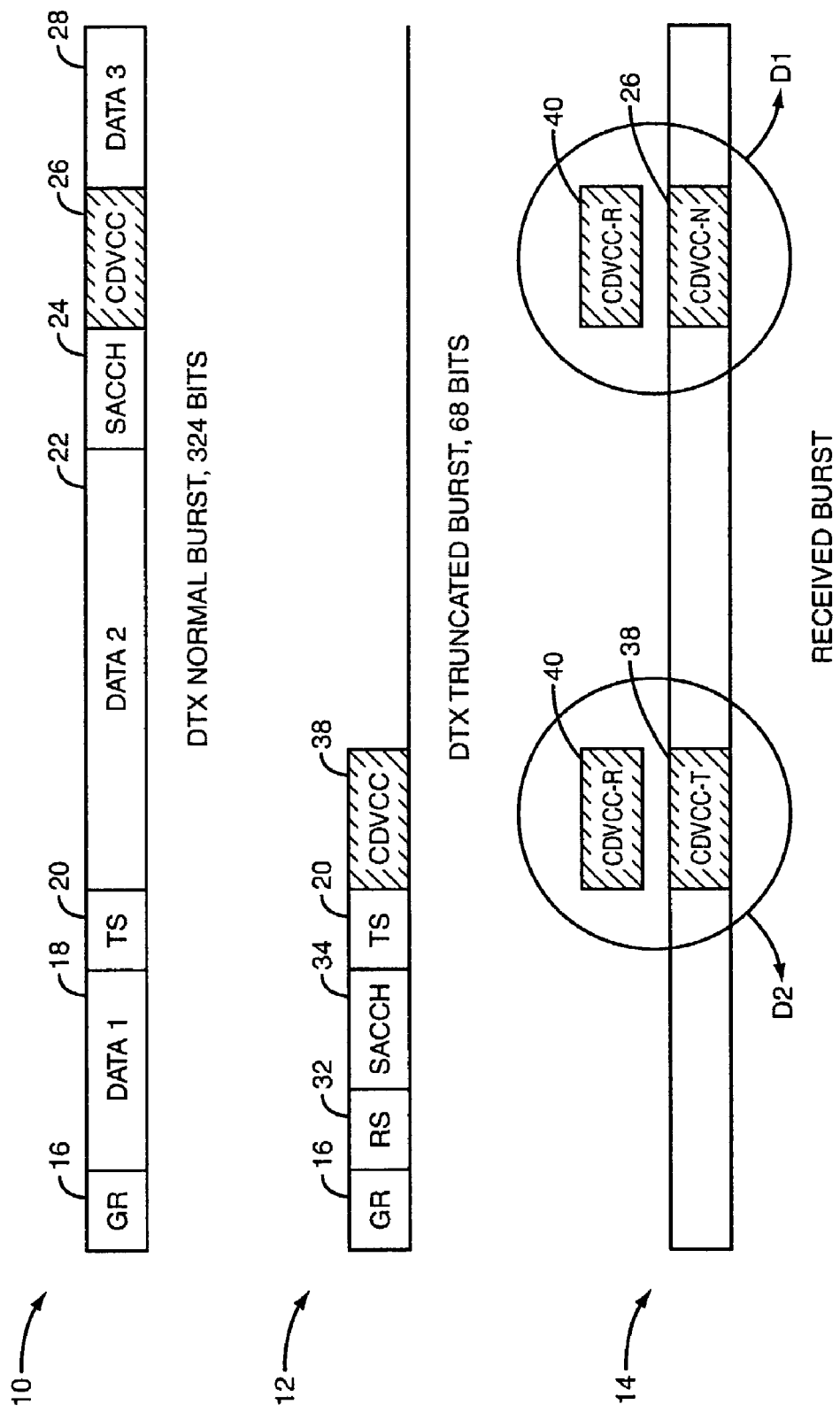
FIG. 1 depicts the formats of normal and truncated bursts, and the comparison method of the present invention as relates to a received burst.

FIG. 1 depicts the data formats of a normal burst 10 and a truncated burst 12. The normal burst 10, comprising 324 bits, includes six Guard and Ramp bits 16, a 16-bit first data field 18, a 28-bit Training Sequence 20, a 128-bit second data field 22, a 12-bit Slow Associated Control Channel (SACCH) sub-frame 24, a 12-bit Coded Digital Verification Color Code (CDVCC) 26, and a 128-bit third data field 28. These various data bits and sub-frame fields are defined in the aforementioned wireless communications standard, are well known to those of skill in the art, and are not further explicated herein. The truncated burst 12, comprising 68 bits, includes the six Guard and Ramp bits 16, a 4-bit reserved field 32, the 12-bit SACCH sub-frame 34, the 28-bit Training Sequence 20, and the 12-bit CDVCC sub-frame 38. Note that the truncated burst SACCH sub-frame 34 and the truncated burst CDVCC sub-frame 38 occupy different positions within the frame than these same data fields occupy within the normal burst 10 (i.e., SACCH 24 and CDVCC 26). The presence of the SACCH sub-frame 34 in the truncated burst 12, in a different position than in the normal burst 10, makes the correct DTX state detection (i.e., DTX-high or DTX-low) desirable. In the case of an erroneous DTX detection, a very high bit error rate will be introduced into the received SACCH sub-frame, resulting in degradation of the overall SACCH performance.

On the other hand, it is the differing location of the CDVCC sub-field within the normal burst 10 and the truncated burst 12 that is exploited by the present invention to achieve a DTX detection with a high success probability, even under low C/I conditions. The CDVCC is a unique 12-bit code word used to identify the base station (or sector thereof) that is handling a call for a mobile terminal. The CDVCC is communicated to the mobile terminal at the call initiation (or handoff) and the mobile terminal returns the CDVCC in its uplink transmissions. The CDVCC is hence a known value, depicted in FIG. 1 as the Reference value, CDVCC_R 40. According to the present invention, the CDVCC_R 40 is compared to up to two positions of a received burst 14—the bit positions corresponding to the CDVCC_N 26 in a normal burst 10, and optionally the bit positions corresponding to the CDVCC_T 38 in a truncated burst 12. Comparison of these bits yield the quantities D1 and D2, respectively, as described more fully herein.

In one embodiment, an initial determination as to the DTX state of a received burst 14, which under high C/I conditions may be a sufficient one, may be made from the value D1, defined as the Euclidian distance between the demodulated soft bits of the CDVCC_N 26 and a soft bit representation of the reference CDVCC_R 40. Soft bits are commonly used in wireless communications systems to optimize the decoder performance. As used herein, the term "soft bit" indicates both the binary value of a demodulated bit and the confidence that the demodulation was performed correctly. For example, the output of a demodulator is typically in a soft bit format. The sign of the soft bit (i.e., a positive or negative voltage level) may indicate the binary value (i.e., 1 or 0). The magnitude of the soft bit, for example a voltage level, may indicate the confidence level that the bit was demodulated correctly. For example, random noise will typically generate soft bits with a value close to 0, with a random excursion in the positive or negative direction. In contrast, bits demodulated from a strong signal in the absence of noise will have a voltage level approaching the maximum soft bit magnitude, indicated as MAX_SOFT, and a sign indicative of their binary value. It is common in digital systems (and simulations thereof) to represent the magnitude of a soft bit as a binary value. For example, a soft bit may be represented by an 11-bit value, with one bit indicating its sign and 10 bits indicating its magnitude. In such a representation, the soft bit may assume any integer magnitude in the range $[0, 2^{10}-1]$, or a MAX_SOFT value of 1023.

The soft bits representing CDVCC_N 26 will have very different statistics depending on whether the received burst 14 was a normal burst 10 or a truncated burst 12. In the case of a normal burst 10, the average magnitude of the soft bits comprising the CDVCC_N 26 will increase with increasing C/I, approaching the maximum magnitude MAX_SOFT. If the received burst 14 was a truncated burst 12, the bits extracted from the CDVCC_N 26 position represent random noise, and will correspondingly produce soft bits exhibiting a low confidence level, with magnitudes close to 0.

Comparing the reference CDVCC_R 40 to the CDVCC_N 26 sub-field of the received burst 14 will indicate whether the received burst 14 is a normal burst 10 or a truncated burst 12. Simply comparing the decoded binary bits of the CDVCC_N 26 to the CDVCC_R 40, i.e., calculating the Hamming distance, will yield the correlation between the bit patterns, offering some indication of the DTX status of the received burst 14. However, according to the present invention, the confidence level of the CDVCC_N 26, as indicated by the magnitude of the soft bits, may additionally be compared to the CDVCC_R 40 bits (wherein the highest confidence level is assumed) to increase the probability of success of the DTX classification of the received burst 14. Thus, the fact that in one case the received bit pattern is a valid signal and in the other case it is random noise is utilized to increase the probability of successful classification. This comparison of the two bit patterns including both the sign and the magnitude, i.e., considering both correlation and confidence, respectively, is referred to herein as the Euclidean distance between the bit patterns. The Euclidean distance may be calculated as follows:

First the CDVCC_R 40 bit pattern is converted to a soft bit format compatible with the demodulated CDVCC_N 26 soft bits. Let $CDVCC\_R_i$ be the i-th bit of CDVCC_R 40, where i equals 1, 2, . . . 12. Each bit of the CDVCC_R 40 is converted to the corresponding ideal soft bit SCD-VCC_R$_i$ according to the following equation:

$$SCDVCC\_R_i = \begin{cases} MAX\_SOFT & \text{if } CDVCC\_R_i = 1 \\ -MAX\_SOFT & \text{if } CDVCC\_R_i = 0 \end{cases} \quad (1)$$

Second, let CDVCC_N$_i$ be the i-th demodulated soft bit of CDVCC_N 26. The average Euclidian distance D1 between the received CDVCC_N 26 and the soft bit format reference SCDVCC_R 40 is calculated according to the following equation:

$$D1 = \sqrt{\sum_{i=1}^{12} (CDVCC\_N_i - SCDVCC\_R_i)^2} \quad (2)$$

If the received burst 14 was a normal burst 10, the signs of CDVCC_N 26 are correlated with the bits of the CDVCC_R 40, and additionally the magnitudes of the CDVCC_N 26 soft bits will tend to be close to MAX_SOFT, making D1 small. On the other hand, if the received burst 14 was a truncated burst 12, there will be very low correlation between the signs of the CDVCC_N 26 and the bits of the CDVCC_R 40. Additionally, the magnitudes of the CDVCC_N 26 soft bits will be on average much smaller compared with MAX_SOFT, making D1 large.

Figure 2:
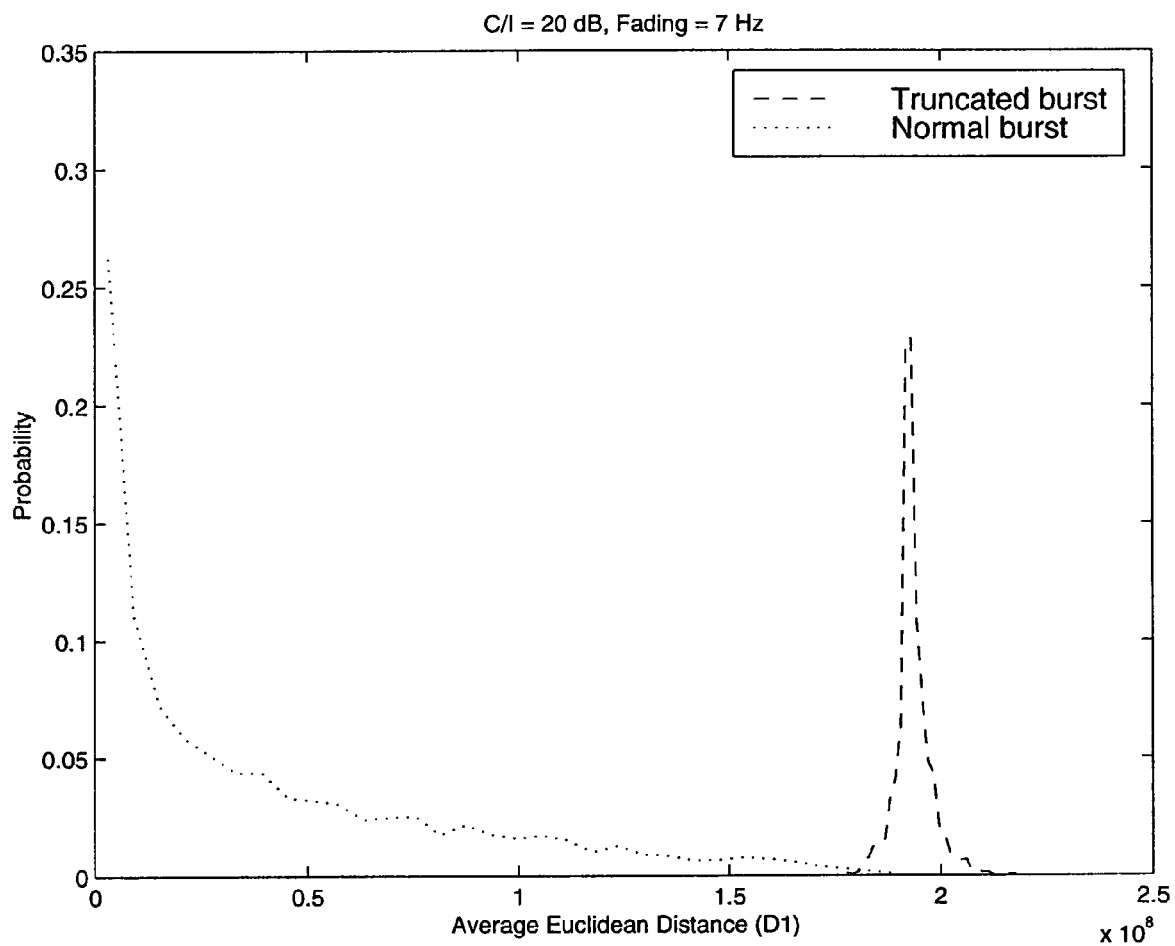
FIG. 2 is a plot of the probability distributions for normal and truncated bursts using D1 to classify the bursts, in a low-noise environment.

FIG. 2 depicts a graph showing the D1 probability distribution of the classification of a large number of received bursts 14 as normal bursts 10, indicated by the dotted line, or truncated bursts 12, indicated by the dashed line, classified by inspection of only D1. The probability distributions represent the envelope of histograms of simulations of large numbers of normal and truncated bursts. The probabilities, plotted in FIG. 2 are for received bursts 14 simulated under a low noise environment, with a C/I of 20 dB. The two probability distributions show adequate separation, and indicate that inspection of D1 alone is sufficient to classify a received burst 14 as being a normal burst 10 or a truncated burst 12, with a high probability of success. In practice, D1 may be compared to a predetermined threshold value T, chosen to lie between the probability distributions for normal and truncated bursts, as determined through simulations. If D1<T, a normal burst 10 is indicated; if D1≧T, a truncated burst 14 was received.

Figure 3:
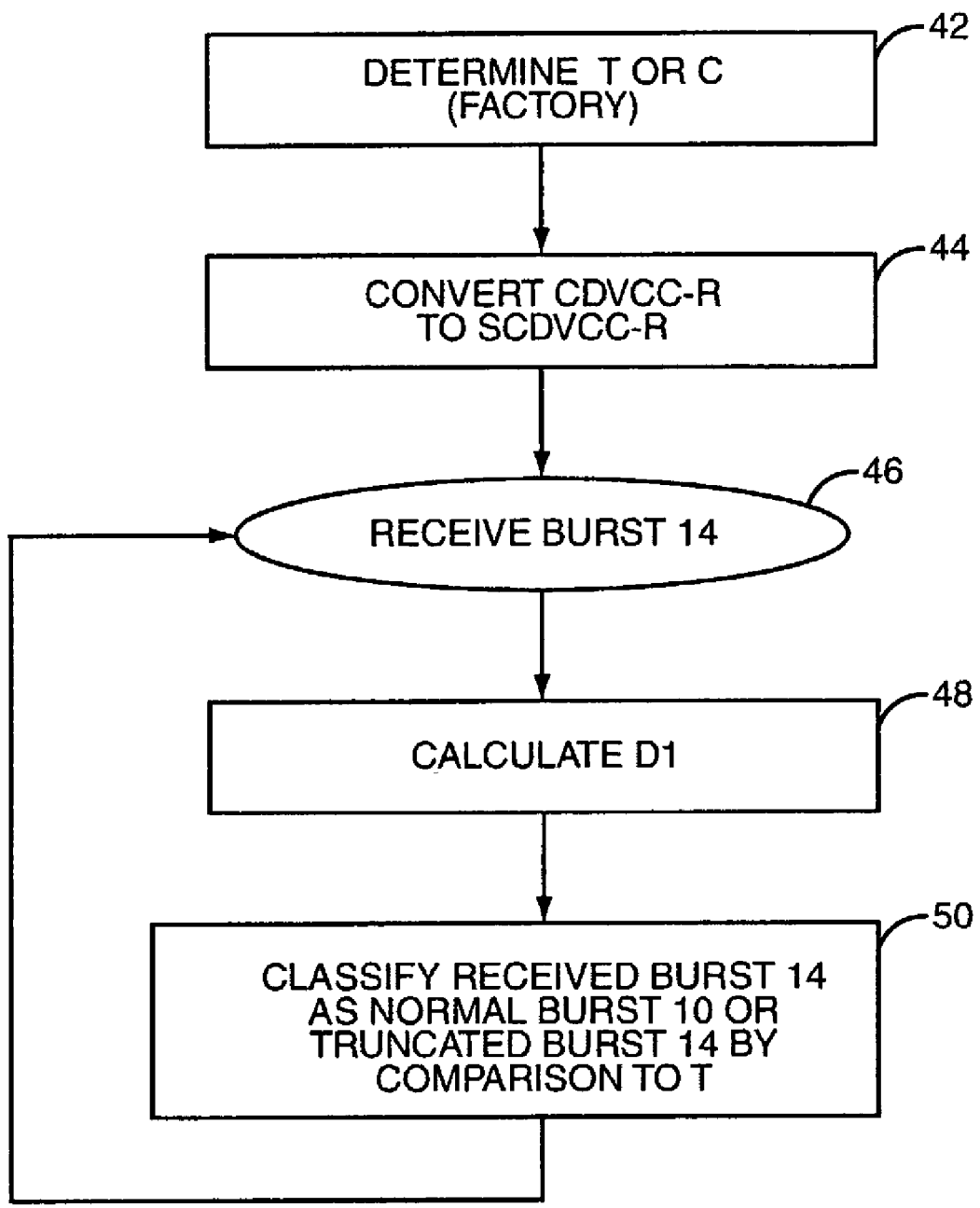
FIG. 3 is a flowchart depicting the method steps of one embodiment of the present invention.

The method of classifying a received burst 14 as a normal burst 10 or truncated burst 14 comparison of D1 to T is depicted in flowchart form in FIG. 3. Initially, the threshold T is determined (block 42), such as through simulation, and is programmed into a receiver at the factory or in a field upgrade. When communication is established between a mobile terminal and a base station (or sector thereof), and a CDVCC is assigned, the soft bit representation SCDVCC_R may be calculated (block 44). The classification methods begin when a burst 14 of unknown DTX state is received by the receiver (block 46). The reference CDVCC_R 40 is compared to the CDVCC_N 26, and the Euclidean distance D1 is calculated (block 48). D1 is compared to the threshold T, and the received burst 14 is classified as a normal burst 10 or truncated burst 14 (block 50).

Figure 4:
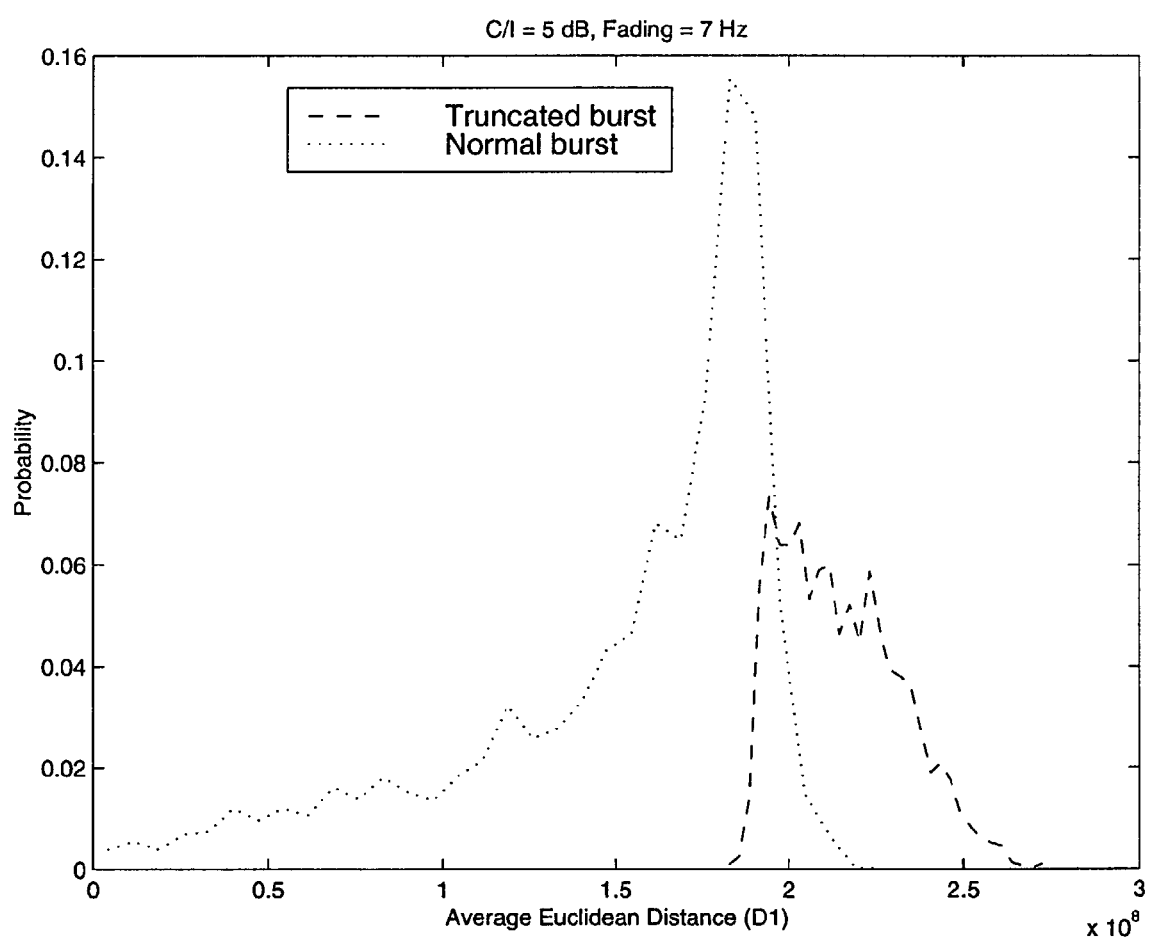
FIG. 4 is a plot of the probability distributions for normal and truncated bursts using D1 to classify the bursts, in a high-noise environment.

Under favorable noise conditions, D1 may be sufficient to enable successful DTX classification. FIG. 4, however, depicts a graph of the same probability distributions as those of FIG. 2, but calculated under a high noise environment, with a C/I of only 5 dB. FIG. 4 indicates a considerable overlap between the probability distributions for a normal burst 10 and a truncated burst 12. Values of D1 for a given received burst 14 that fall within this range of overlap cannot be classified as arising from a normal burst 10 or a truncated burst 14 with any reasonable probability of success. Thus, inspection of D1 alone is insufficient to positively categorize the received burst 14 in a low C/I environment.

Consequently, according to one embodiment of the present invention, the two distributions depicted in FIGS. 2 and 4 may be further separated, even under very low C/I conditions, by calculating and considering a second Euclidian distance D2. D2 is the Euclidian distance between the bit positions of the received burst 14 that correspond to the CDVCC_T 38 of a truncated burst 12 and the reference CDVCC_R 40. D2 is calculated in much the same manner as D1, substituting the soft bits representing CDVCC_T 38 for the soft bits representing CDVCC_N 26. Soft bits SCDVCC_R$_i$ representing an ideal soft bit representation of CDVCC_R 40, are calculated as above, according to equation (1). The equation for the Euclidian distance D2 is thus:

$$D2 = \sqrt{\sum_{i=1}^{12} (CDVCC\_T_i - SCDVCC\_R_i)^2} \quad (3)$$

Regardless of whether a normal burst 10 or a truncated burst 12 has been demodulated, the magnitudes of the CDVCC_T 38 soft bits have the same statistics, since in both cases actual signals were transmitted during the time slot allocated to the CDVCC 38. For truncated bursts 12, the signs of the CDVCC_T 38 soft bits will be correlated with the signs of the soft bits SCDVCCR, since the binary value CDVCC_R 40 was actually transmitted during the CDVCC_T 38 time slot, making D2 small. However, for normal bursts 10, the signs of the CDVCC_T 38 soft bits are random, since the data transmitted during the CDVCC_T 38 time interval is part of the speech frame, making D2 large.

The final DTX state detection for the received burst 14 is based on the ratio R between D1 and D2, $$R = \frac{D1}{D2} \quad (4)$$

Figure 5:
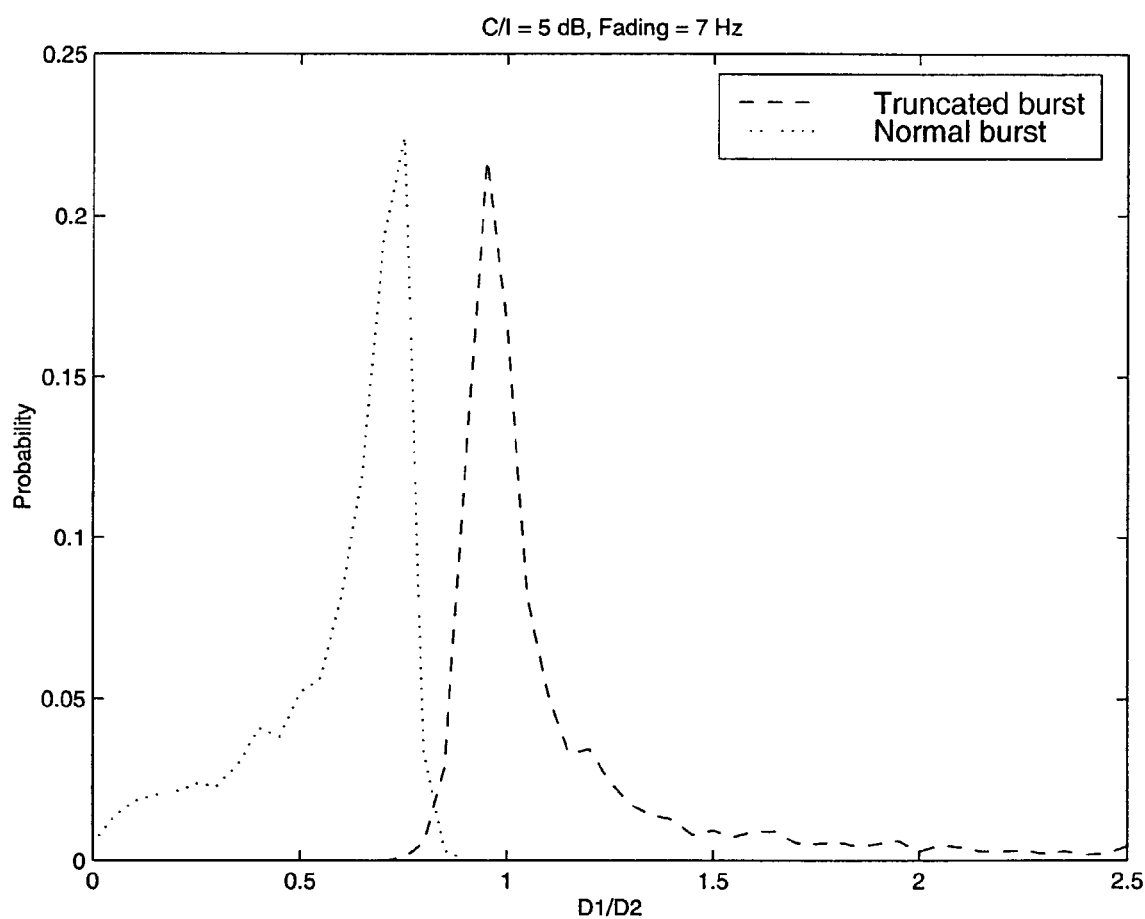
FIG. 5 is a plot of the probability distributions for normal and truncated bursts using the ratio D1/D2 to classify the bursts, in a high-noise environment.

From the explanations above considering the trends of D1 and D2, it follows that R tends to be small for normal bursts 10, since in the case of a normal burst 10, D1 tends to be small while D2 tends to be large. The opposite is true for truncated bursts 14; R tends to be large since D1 tends to be large while D2 tends to be small. In general, the probability distributions for R in the case of a normal burst 10 and a truncated burst 12 tend to exhibit greater separation and less overlap than the corresponding D1 distributions, under the same C/I environment. This significantly increases the probability of a successful DTX state detection. This result is depicted in FIG. 5, showing the probability distributions of R in the case of a normal burst 10 (dotted line) and a truncated burst 12 (dashed line) for a noise environment identical to that depicted in FIG. 4, i.e., a C/I of 5 dB.

A simple DTX classification using the ratio R may be performed by comparing R to a predetermined threshold T. If R is greater than or equal to T, the received burst 14 is classified as a truncated burst 12. If R is less than T, a normal burst 10 was received. The value of T is chosen to be in the region where the two probability distributions overlap. As discussed above, with increasing C/I, the probability distributions exhibit greater separation, allowing greater flexibility in the threshold T. Conversely, as the C/I decreases, the overlap of the two distributions increases. Since the noise environment cannot be known a priori, a single threshold value T must be chosen, which is generally a value T that will give reasonable performance under worst case conditions. Once selected, the value of the threshold T will typically remain static, as adaptive thresholding is computationally intensive, and under unusual conditions can cause a value T to be selected that yields erroneous classifications.

In one embodiment of the present invention, the thresholding function for the classification of a received burst 14 as being a normal burst 10 or a truncated burst 12 is not a single value T, but rather a two-dimensional curve. For any given set of environmental variables (such as for example, the C/I environment, the Doppler values, and various values for the a multipath delay tau,), comparison of a received burst 14 to the CDVCC_R 40 will yield values for D1 and D2, as described above. By simulating the transmission of both a normal burst 10 and a truncated burst 12 under each set of conditions, a plurality of D1/D2 value pairs are acquired, which form two clusters—one cluster of values corresponding to the normal bursts 10 and another corresponding to the truncated bursts 12. Plotting the pairs of D1, D2 values in a scatter plot diagram on a graph with D1 as the abscissa and the D2 as the ordinate reveals that a thresholding function that best separates the two cases is not a single value but a two-dimensional curve. The shape of the curve, however, was found to vary significantly according to the C/I environment. Thus, it was determined to normalize the values D1 and D2 by dividing by the average received signal strength indicator (RSSI) on a burst by burst basis. The RSSI parameter is already calculated in the equalizer, and is readily available. In the case of an n-way diversity receiver, the RSSI is averaged over the duration of the burst at each leg of the diversity receiver, and the maximum of these n average RSSI values is chosen as the normalization factor. This value is referred to herein as the "maximum average RSSI," a term that encompasses simply the average RSSI in a non-diversity receiver. The normalized D1 and D2 values result in consistent classification performance using a single thresholding function over a wide range of C/I values. The normalized D1 and D2 equations are shown below:

$$D1_{Normalized} = \frac{D1}{RSSI_{AVG}} \quad (5)$$

$$D2_{Normalized} = \frac{D2}{RSSI_{AVG}} \quad (6)$$

Figure 6:
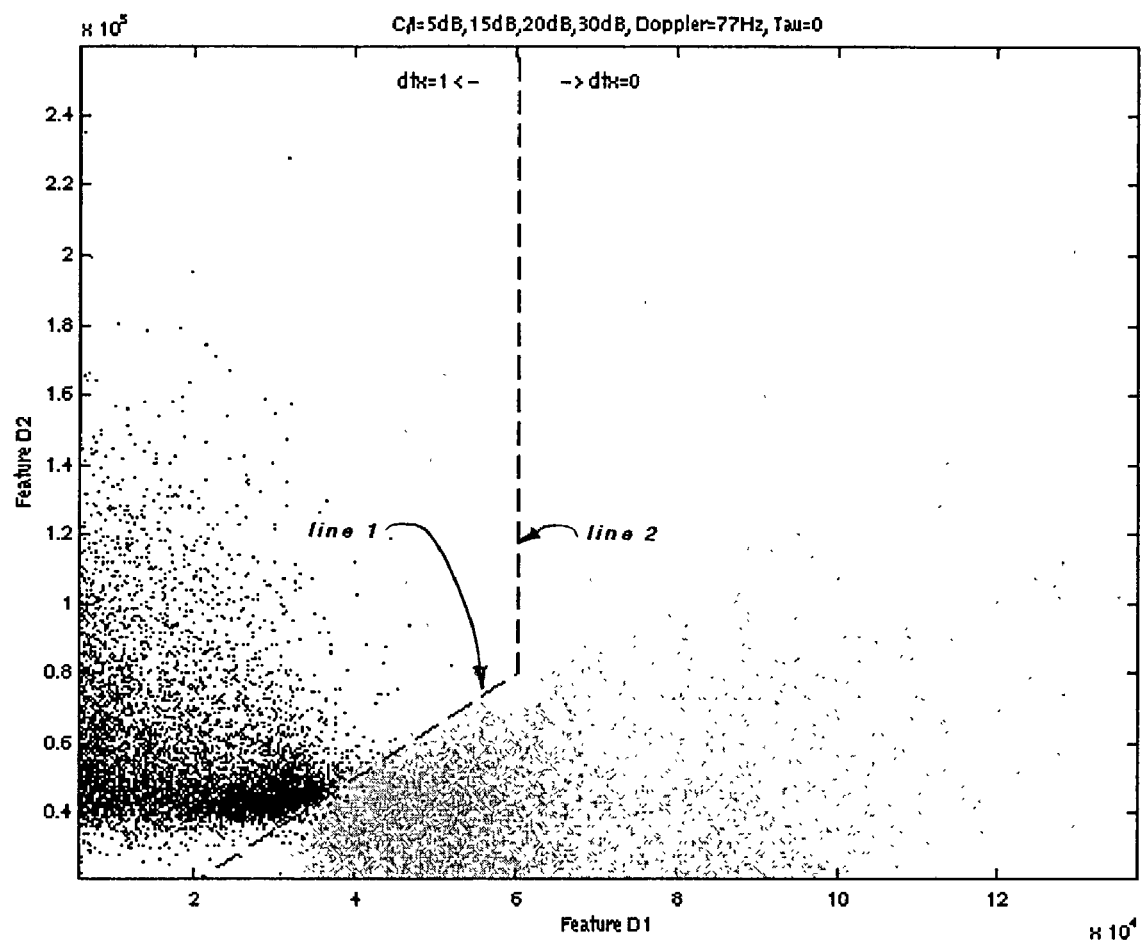
FIG. 6 is a scatterplot of normalized D1, D2 points under a variety of channel conditions, and a piece-wise linear thresholding function.

FIG. 6 depicts a scatter plot diagram of points representing both normal bursts 10 and truncated bursts 12 over a wide variety of environmental conditions. The normalized D1 and normalized D2 values for each set of conditions are plotted. Mathematical analysis of the values of the plotted points to minimize false detection yielded the piece-wise linear curve C used to classify the received burst 14 as being a normal burst 10 or a truncated burst 12. The line segment boundaries were optimized for C/I=[5, 15, 20, 30] dB; Doppler=[7, 77] Hz and tau=[0, 4, 8] samples. Under these conditions, the equations of the line segments depicted in FIG. 6 were determined to be:

$$\text{line 1}: \frac{D2}{RSSI_{AVG}} = 1.498 \cdot \frac{D1}{RSSI_{AVG}} - 9968 \quad (7)$$

$$\text{line 2}: \frac{D1}{RSSI_{AVG}} = 60300 \quad (8)$$

The above equations and the results plotted in FIG. 6 are representative only. In general, any two-dimensional curves C may be utilized for the thresholding function of classifying a received burst 14 as a normal burst 10 or a truncated burst 12. For example, a more complex curve, either comprising a greater number of piece-wise linear segments or a higher order mathematical function, may provide better classification accuracy, at the expense of computational complexity, as will be understood by those of skill in the art.

Figure 7:
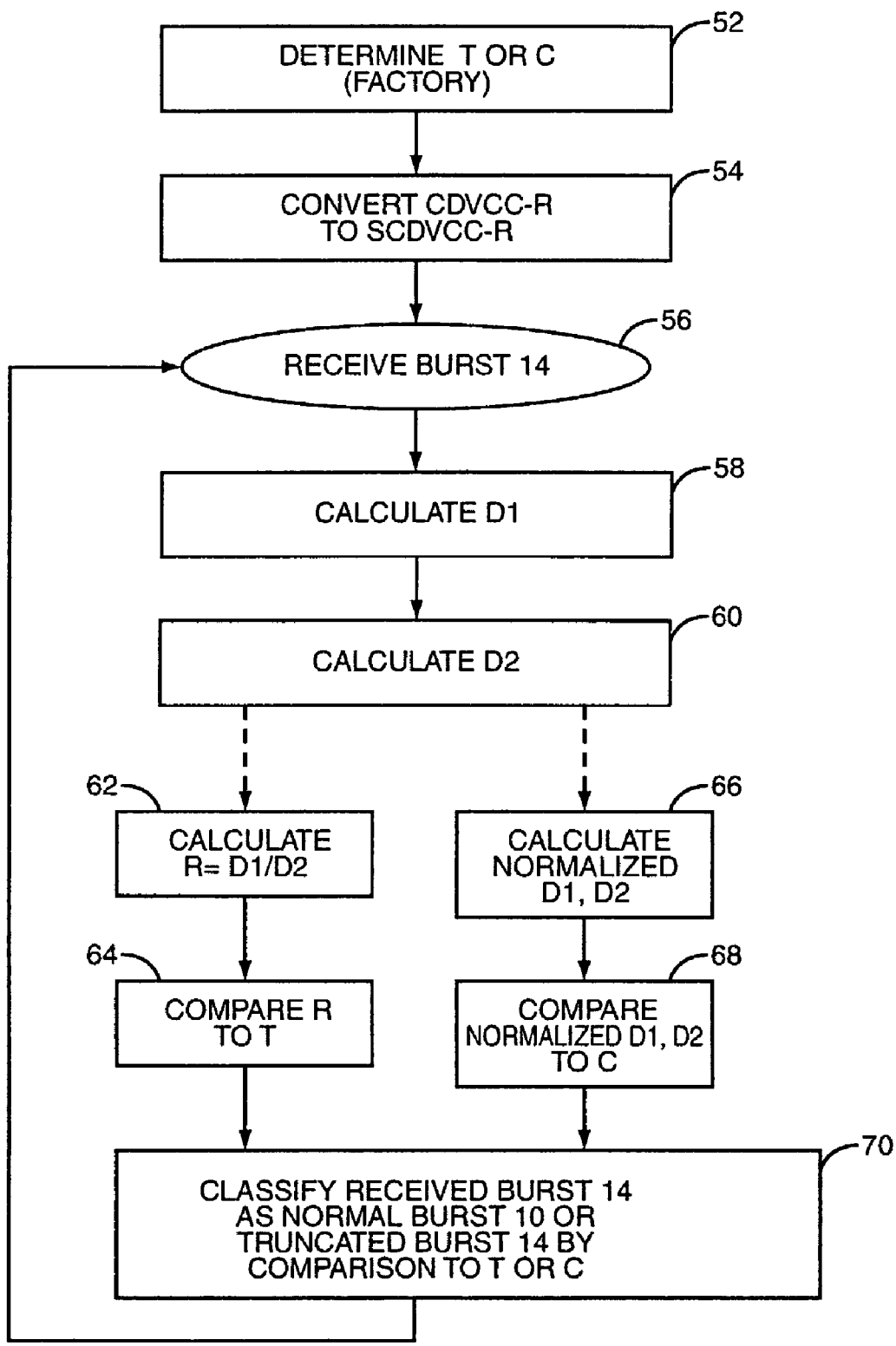
FIG. 7 is a flowchart depicting the method steps of two embodiments of the present invention.

The methods of the present invention utilizing both D1 and D2, as described above, maximize the separation of probability distributions of the normal burst 1 band truncated burst 12 conditions, even under very low C/I environments. This separation allows for a high probability of success in classifying the DTX state of a received burst 14. The methods are depicted in flowchart form in FIG. 7. The initial steps are the same as the method utilizing only D1, depicted in FIG. 3. First, the classification threshold T or curve C is determined (block 52), such as through simulation, and is programmed into a receiver at the factory or in a field upgrade. When communication is established between a mobile terminal and a base station (or sector thereof), and a CDVCC is assigned, the soft bit representation SCDVCC_R may be calculated (block 54). The classification methods begin when a burst 14 of unknown DTX state is received by the receiver (block 56). The reference CDVCC_R 40 is compared to the CDVCC_N 26, and the Euclidean distance D1 is calculated (block 58). To achieve greater accuracy in classification by additionally comparing the characteristics of the reference CDVCC_R 40 to the characteristics of the CDVCC_T 38, D2 is calculated (step 60). Since the Euclidian rather than Hamming distance is used in both comparisons, all information contained in the soft bits, i.e., both binary value and demodulation confidence, is considered. In one embodiment, the ratio R is calculated (step 62), and compared to the threshold T (step 64). In another embodiment, the D1 and D2 values are normalized by the maximum RSSI (step 66). The normalized D1, D2 values are then compared to a thresholding curve C (step 68). In both methods, the DTX state classification of the received burst 14 is performed at step 70, with a high probability of success as compared to prior art classification methods. One of the methods is then repeated upon receiving a new burst 14 (step 56).

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of classifying a received data frame as being a Discontinuous Transmission (DTX) high or low class, each of said classes having a corresponding format wherein a known bit pattern is located in a different respective position within said data frame, said method comprising:

receiving said frame;
computing a first value representing a confidence-weighted correlation between said known bit pattern and data from a first position of said frame; and
classifying said frame as being a DTX-high or DTX-low class based on said first value.

2. The method of claim 1 further comprising computing a second value representing a confidence-weighted correlation between said known bit pattern and data from a second position of said frame, said second position different from said first position, and wherein classifying said frame as being a DTX-high or DTX-low class is additionally based on said second value.

3. The method of claim 2 wherein classifying said frame as being a DTX-high or DTX-low class comprises computing a ratio of said first value to said second value, and comparing said ratio to a predetermined threshold.

4. The method of claim 2 further comprising calculating a normalized first value by dividing said first value by a measured parameter, and calculating a normalized second value by dividing said second value by said measured parameter, and wherein classifying said frame as being a DTX-high or DTX-low class comprises comparing said normalized first value and said normalized second value to a predetermined function.

5. The method of claim 4 wherein said measured parameter is the maximum of the average received signal strength indicators over the duration of the receipt of said frame, measured at each diversity receiver antenna.

6. The method of claim 4 wherein said predetermined function includes at least one substantially linear segment.

7. The method of claim 2 wherein computing a second value representing a confidence-weighted correlation between said known bit pattern and data from a second position of said frame, said second position different from said first position, comprises calculating the Euclidian distance between said known bit pattern and said data from a second position of said frame, said second position different from said first position.

8. The method of claim 1 wherein said known bit pattern is a coded digital verification color code (CDVCC).

9. The method of claim 1 wherein computing a first value representing a confidence-weighted correlation between said known bit pattern and data from a first position of said frame comprises calculating the Euclidian distance between said known bit pattern and said data from a first position of said frame.

10. The method of claim 1 wherein said received data frame is processed in a first manner or in a second manner different from said first manner, based on the classification of said frame as being a DTX-high or DTX-low class.

11. A method of classifying a received data frame as being in one of two possible formats, each said format including a known bit pattern in a different known position, comprising:
determining D1, the Euclidian distance between said known bit pattern and the demodulated soft bits occupying a first position in said received data frame;
determining D2, the Euclidian distance between said known bit pattern and the demodulated soft bits occupying a second position in said received data frame;
calculating the ratio R=D1/D2;
comparing the ratio R to a predetermined threshold value T; and
if R<T, classifying the received data frame as being in the format wherein said known bit pattern occupies said first position; and
if R≧T, classifying the received data frame as being in the format wherein said known bit pattern occupies said second position.

12. The method of claim 11, wherein the format wherein said known bit pattern occupies said first position is a normal burst corresponding to a discontinuous transmission-high (DTX-high) state, and the format wherein said known bit pattern occupies said second position is a truncated burst corresponding to a discontinuous transmission-low (DTX-low) state.

13. The method of claim 11, wherein said Euclidian distances are calculated after converting said known bit pattern to a format corresponding to said demodulated soft bits.

14. The method of claim 13, wherein said Euclidian distances are calculated as the square root of the summation over the length of said known bit pattern of the square of the difference between said converted known bit and said demodulated soft bit.

15. A method of classifying a received data frame as being in one of two possible formats, each said format including a known bit pattern in a different known position, comprising:
determining D1, the Euclidian distance between said known bit pattern and the demodulated soft bits occupying a first position in said received data frame;
calculating a normalized D1 by dividing D1 by a measured parameter;
determining D2, the Euclidian distance between said known bit pattern and the demodulated soft bits occupying a second position in said received data frame;
calculating a normalized D2 by dividing D2 by said measured parameter; and
classifying said received data frame as being in the format wherein said known bit pattern occupies said first position or in the format wherein said known bit pattern occupies said second position by comparing said normalized D1 and normalized D2 to a thresholding function.

16. The method of claim 15 wherein said measured parameter is the maximum average RSSI over said received data frame.

17. The method of claim 15 wherein said thresholding function comprises a piece-wise linear function.

18. The method of claim 15 wherein comparing said normalized D1 and normalized D2 to a thresholding function comprises determining if the point (normalized D1, normalized D2) when plotted on a two-dimensional graph with the normalized D1 as the abscissa and the normalized D2 as the ordinate, falls to the right or left of said thresholding function when plotted on the same graph.

19. The method of claim 15, wherein the format wherein said known bit pattern occupies said first position is a normal burst corresponding to a discontinuous transmission-high (DTX-high) state, and the format wherein said known bit pattern occupies said second position is a truncated burst corresponding to a discontinuous transmission-low (DTX-low) state.

20. The method of claim 15, wherein said Euclidian distances are calculated after converting said known bit pattern to a format corresponding to said demodulated soft bits.

21. The method of claim 15, wherein said Euclidian distances are calculated as the square root of the summation over the length of said known bit pattern of the square of the difference between said converted known bit and said demodulated soft bit.

* * * * *